(12) United States Patent
Bhatnagar et al.

(10) Patent No.: US 11,693,679 B2
(45) Date of Patent: *Jul. 4, 2023

(54) SYSTEMS AND METHODS FOR RECOMMENDING OPTIMIZED VIRTUAL-MACHINE CONFIGURATIONS

(71) Applicant: VMware, Inc., Palo Alto, CA (US)

(72) Inventors: Yash Bhatnagar, Bangalore (IN); Dileep Varma Kalidindi, Bangalore (IN); Sivaraj M, Bangalore (IN); Venkata Naga Manohar Kondamudi, Bangalore (IN); Amit Kumar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,173

(22) Filed: Dec. 8, 2021

(65) Prior Publication Data

US 2022/0100552 A1 Mar. 31, 2022

Related U.S. Application Data

(63) Continuation of application No. 16/368,901, filed on Mar. 29, 2019, now Pat. No. 11,216,295.

(30) Foreign Application Priority Data

Jan. 21, 2019 (IN) .............................. 201941002435

(51) Int. Cl.
*G06F 9/455* (2018.01)
*H04L 67/1004* (2022.01)
*G06F 9/50* (2006.01)

(52) U.S. Cl.
CPC .......... *G06F 9/45504* (2013.01); *G06F 9/455* (2013.01); *G06F 9/45533* (2013.01);
(Continued)

(58) Field of Classification Search
CPC ..... H04L 67/10; H04L 67/1008; G06F 9/455; G06F 9/45504; G06F 9/45533; G06F 9/45558
See application file for complete search history.

(56) References Cited

U.S. PATENT DOCUMENTS 7,047,177 B1 5/2006 Lee
9,448,819 B1 9/2016 Adogla
(Continued)

*Primary Examiner* — Tuan A Vu
(74) *Attorney, Agent, or Firm* — Clayton, McKay & Bailey, PC

(57) ABSTRACT

An example method is provided for recommending VM configurations, including one or more servers upon which one or more VMs can run. A user wishing to run these VMs can request a recommendation for an appropriate server or set of servers. The user can indicate a category corresponding to the type of workload that pertains to the VMs. The system can receive the request and identify a pool of servers available to the user. Using industry specifications and benchmarks, the system can classify the available servers into multiple categories. Within those categories, similar servers can be clustered and then ranked based on their levels of optimization. The sorted results can be displayed to the user, who can select a particular server (or group of servers) and customize the deployment as needed. This process allows a user to identify and select an optimized setup quickly and accurately.

20 Claims, 4 Drawing Sheets

(52) U.S. Cl.
CPC .......... *G06F 9/45558* (2013.01); *G06F 9/505* (2013.01); *H04L 67/1004* (2013.01); *G06F 2009/4557* (2013.01)

(56) References Cited

U.S. PATENT DOCUMENTS

| | | |
|---|---|---|
| 9,703,641 B1 | 7/2017 | Viswanathan |
| 10,305,743 B1 | 5/2019 | Angrish |
| 2009/0276771 A1* | 11/2009 | Nickolov ............ H04L 67/1008 718/1 |
| 2013/0042123 A1 | 2/2013 | Smith |
| 2015/0135185 A1* | 5/2015 | Sirota .................... H04L 67/10 718/103 |
| 2015/0195173 A1 | 7/2015 | Gupta |

* cited by examiner

FIG. 3

SYSTEMS AND METHODS FOR RECOMMENDING OPTIMIZED VIRTUAL-MACHINE CONFIGURATIONS

This application claims priority as a continuation of U.S. patent application Ser. No. 16/368,901, filed in the U.S. on Mar. 29, 2019, which claims priority to IN 201941002435, filed in India on Jan. 21, 2019, both of which are expressly incorporated herein in their entireties.

RELATED APPLICATIONS

Benefit is claimed under 35 U.S.C. 119(a)-(d) to Foreign Application Serial No. 201941002435 filed in India entitled "SYSTEMS AND METHODS FOR RECOMMENDING OPTIMIZED VIRTUAL-MACHINE CONFIGURATIONS", on Jan. 21, 2019, by VMWARE, Inc., which is herein incorporated in its entirety by reference for all purposes.

BACKGROUND

Cloud-based infrastructure can provide to customers the computing resources necessary to perform various computing tasks. A cloud-based infrastructure can allow a customer to utilize one or more virtual machines ("VM"s) that utilize the resources of hardware components within the infrastructure. Because different hardware components can offer different strengths and weaknesses, optimizing the use of those components can reduce costs and increase efficiency.

When a customer selects hardware components, such as servers, to utilize within a cloud-based infrastructure, the customer typically considers the types of workloads that will be serviced. For example, a machine-learning workload can require high levels of central processing unit ("CPU") utilization, a multitasking workload can require high levels of memory utilization, and an image-processing workload can require high levels of central processing unit ("CPU") and graphics processing unit ("GPU") utilization. In each of those examples, a customer would be best served by selecting servers that are optimized for the particular workload that it will encounter.

However, selecting optimized servers on which to configure relevant VMs is traditionally a manual and imprecise process. For example, a customer administrator can determine that, generally speaking, a server with more CPU cores will be better for CPU-intensive processes, while a server with more random access memory ("RAM") will be better for memory-intensive processes. These selection mechanisms are typically based on past experiences and decision-making heuristics and can suffer when the decision maker lacks the time to fully consider all available options. As a result, the process is inefficient and lacks precision.

As a result, a need exists for systems and methods for recommending optimized VM configurations in an efficient, accurate, and timely manner.

SUMMARY

Examples described herein include systems and methods for recommending optimized VM configurations. As used herein, a "VM configuration" can include information required to set up and run VMs, such as an identification of one or more servers upon which the VMs will execute. An example method for recommending optimized VM configurations can include receiving a request from a user to recommend a VM configuration. The request can include an indication of a category of computing resources most relevant to the user. Example categories include, for example, memory, processing, memory and graphics, or processing and graphics. The request can be provided through a user interface associated with a management system for a cloud-based infrastructure, such as VMware vRealize®.

The example method can include identifying a pool of servers available to the user. This can involve accessing a database storing information about the servers available to the user, for example. The example method can also include classifying the available servers into one of several categories. The classification process can include obtaining, from a reference library, information regarding servers available in the industry and comparing that information to the servers available to the user. The information can include specifications such as the number of CPU cores, amount of RAM storage, and presence of a GPU, for example. The method can include using this information to classify the available servers into groups.

In one example, the classification process can include determining a computing ratio for each of the available server types. The computing ratio can be a ratio of memory to the number of CPU cores for a server, for example. The ratio can be compared to one or more thresholds indicating that a particular server is optimized for a particular task. For example, a memory threshold can indicate when a server is optimized for memory-intensive tasks, while a CPU threshold can indicate when a server is optimized for CPU-intensive tasks. The example method can include classifying the available servers into one of four categories: memory, processing, memory and graphics, and processing and graphics.

After classification, the example method can include clustering similar servers within each of the classified categories. The servers in each cluster can then be sorted according to various factors, such as their level of optimization or total amount of relevant resources. The example method can also include displaying VM recommendations to the user based on the sorting results. For example, a graphical user interface ("GUI") can list various server options for the user to choose from. The user can also choose to customize those options through the GUI as desired.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 3 is an illustration of an example GUI for performing the various methods described herein.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

An example method is provided for recommending optimized VM configurations. A VM configuration can include an identification of one or more servers upon which one or more VMs can run. A user wishing to run these VMs can request a recommendation for an appropriate server or set of servers. The user can indicate a category corresponding to the type of workload that pertains to the VMs. The system can receive the request and identify a pool of servers available to the user. Using industry specifications and benchmarks, the system can classify the available servers into multiple categories. Within those categories, similar servers can be clustered and then ranked based on their levels of optimization. The sorted results can be displayed to the user, who can select a particular VM configuration corresponding to a server cluster and customize the deployment as needed. This process allows a user to identify and select an optimized setup quickly and accurately.

Figure 1:
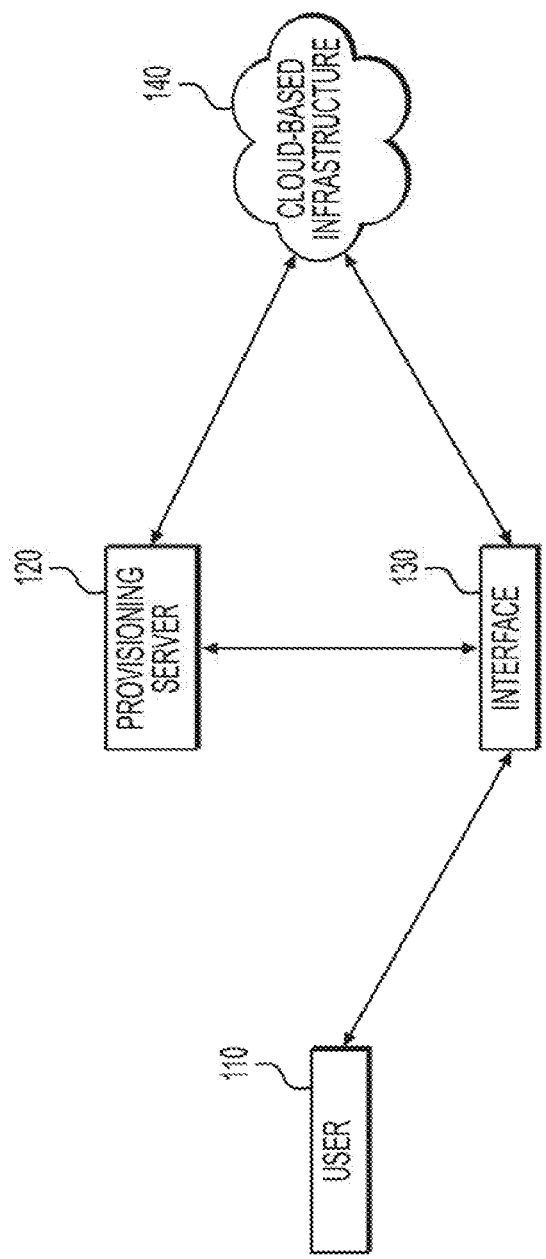
FIG. 1 is an illustration of a system for performing recommending optimized VM configurations.

FIG. 1 is an illustration of an example system for recommending optimized VM configurations. The illustration shows a user 110, which can refer to any individual, enterprise, or entity that intends to utilize a cloud-based infrastructure 140. The user 110 can be a customer of a service provider that offers access to the cloud-based infrastructure 140, in one example. In some examples, the user 110 is an administrator of an enterprise.

The user 110 can access an interface 130, such as VMware® vRealize®, to access the cloud-based infrastructure 140 and provision resources as needed. The interface 130 can include a GUI that the user 110 navigates to request information and make selections. The interface 130 is described in more detail with respect to FIGS. 3 and 4.

The interface 130 can be communicatively coupled to at least the cloud-based infrastructure 140 and a provisioning server 120. The provisioning server 120 can be a part of the cloud-based infrastructure 140, in some examples, or it can be a separate server or group of servers that has rights and permissions relevant to the cloud-based infrastructure 140. The provisioning server 120 can receive information from the user 110, such as a request to recommend an optimized server for a VM configuration. The provisioning server 120 can also access the cloud-based infrastructure 140 to determine available resources, servers, server types, and any other metric associated with the cloud-based infrastructure 140. The provisioning server 120 can request and receive information from both the interface 130 and the cloud-based infrastructure 140, and analyze that information to generate recommendations or take other actions. These methods are described with respect to FIG. 2, for example.

The cloud-based infrastructure 140 can include a physical data center. The physical data center can include a virtual-infrastructure management server ("VI server") and any of various different computers on which a virtual-data-center management interface may be displayed to system administrators and other users. The interface can be a software-based control system. The physical data center can also include a number of server computers that are coupled together by local area networks. The individual server computers can each include a virtualization layer and run multiple VMs. Different physical data centers may include may different types of computers, networks, data-storage systems, and devices connected according to many different types of connection topologies. A logical abstraction layer abstracts the physical data center to a virtual data center comprising one or more resource pools, one or more virtual data stores, and one or more virtual networks. In some implementations, the resource pools abstract banks of physical servers interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI server includes functionality to migrate running virtual machines from one physical server to another in order to optimally or near optimally manage resource allocation, provide fault tolerance, and high availability. It can migrate virtual machines to most effectively utilize underlying physical hardware resources, to replace virtual machines disabled by physical hardware problems and failures, and to ensure that multiple virtual machines supporting a high-availability virtual appliance are executing on multiple physical computer systems. This ensures the services provided by the virtual appliance are continuously accessible, even when one of the multiple virtual appliances becomes compute bound, data-access bound, suspends execution, or fails. Thus, the virtual-data-center layer of abstraction provides a virtual-data-center abstraction of physical data centers to simplify provisioning, launching, and maintenance of virtual machines and virtual appliances. The virtual-data-center layer of abstraction can also provide high-level, distributed functionalities that involve pooling the resources of individual physical servers and migrating virtual machines among physical servers to achieve load balancing, fault tolerance, and high availability.

The cloud-based infrastructure 140 can be configured through interface 130, which can be displayed on a user device such as a computer or smartphone. For example, a user 110 can use a computer browser to navigate to a web portal that includes interface 130. The user 110 can then use interface 130 to request a recommendation for an optimized VM configuration and then select and implement a VM configuration.

Figure 2:
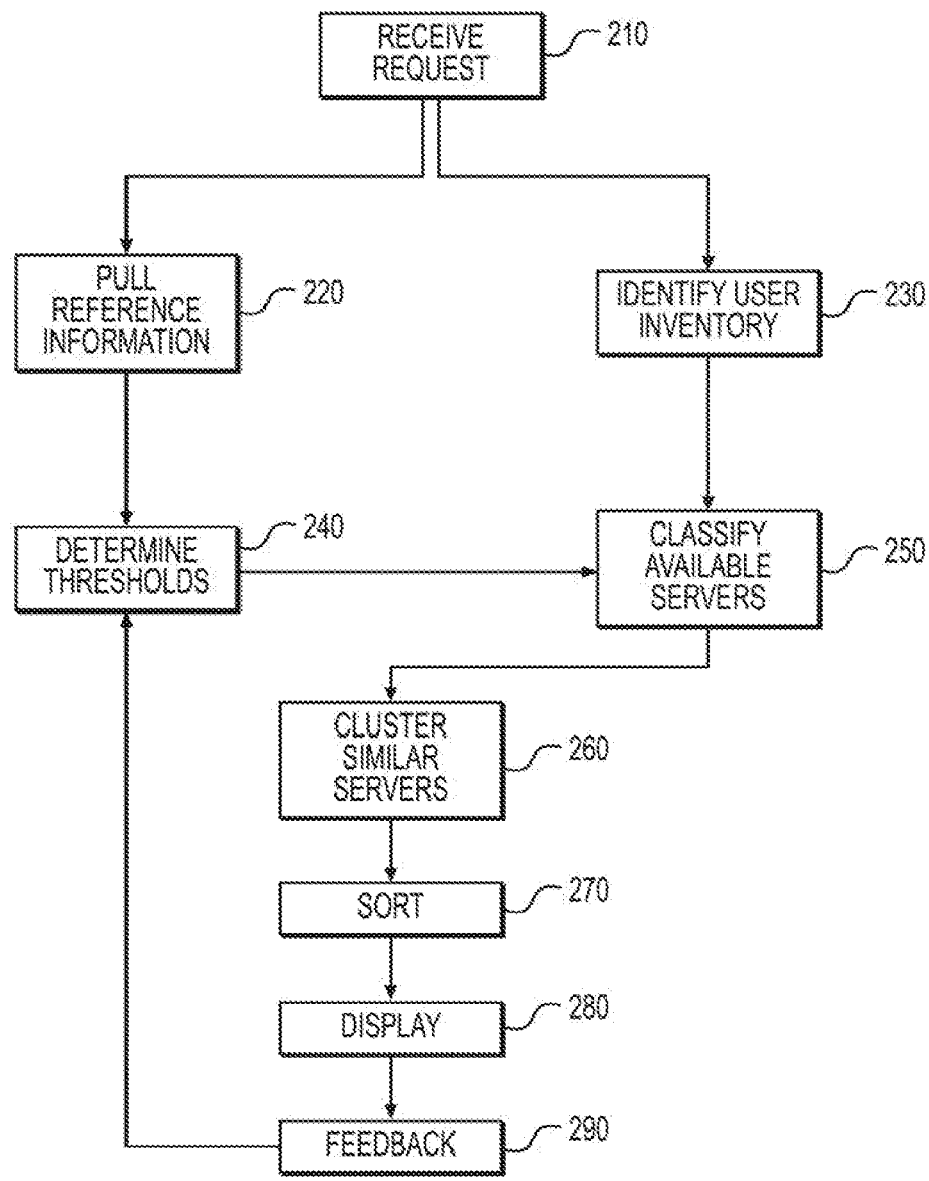
FIG. 2 is a flowchart of an example method recommending optimized VM configurations.

FIG. 2 provides a flowchart of an example method for recommending an optimized VM configuration. Unless noted otherwise, the example stages of the flowchart of FIG. 2 can be performed by the provisioning server 120 of FIG. 1.

Stage 210 can include receiving a request from the user 110 for a recommendation. The request can be provided at the interface 130 and received at the provisioning server 120, for example. The request can be an automatic part of a provisioning process, or it can be made by the user 110 on demand.

At stage 220, the provisioning server 120 can retrieve reference information from a reference library. The reference library can be stored within provisioning server 120 or at a remote storage location. In some examples, the reference library is retrieved from a web location that is continuously updated. The reference information can include industrial benchmark data of various available servers. For example, the benchmark data can be obtained from VMware vRealize Business for Cloud®. The reference information can include a listing of server types and their accompanying specifications. For example, the reference information can include, for each server or server type, a number of CPUs, number of cores per CPU, CPU speed, amount of memory, memory speed, presence or absence of a GPU, GPU speed, storage availability, current utilization, operating system, power requirements, and any other relevant information.

The reference information gathered at stage 220 can be used to determine thresholds at stage 240. In some examples, the process of determining thresholds can include, first, establishing an internal ratio for each server in the reference library. The internal ratio can be defined as the ratio of total vCPUs to the total memory of the server. A vCPU, or virtual processor, can be any CPU that is assignable to a VM. By default, a VM is assigned one vCPU. Therefore, the total number of vCPUs can be considered the total number of CPU cores installed in the server. The total memory of the server can be considered the size—in gigabytes, for example—of the RAM-type memory installed in the server. For the purposes of this disclosure, vCPUs are referred to as CPUs, and similarly vGPUs are referred to as GPUs.

As an example, a server with two four-core CPUs and two 16 GB RAM components would have a ratio of 4. This ratio is obtained at the provisioning server 120 by dividing the total RAM memory (32 GB) by the total number of CPU cores (8). As another example, a server with four eight-core CPUs and two 32 GB RAM components would have a ratio of 2. This ratio is obtained at the provisioning server 120 by dividing the total RAM memory (64 GB) by the total number of CPU cores (32).

Stage 240 can include determining one or more thresholds based on the reference information gathered at stage 220. The thresholds can be established to identify servers that have a particularly high or low internal ratio relative to other servers in the reference library. In one example, lower and upper thresholds are established. The thresholds can reflect percentiles relative to the total group of reference servers. For example, a lower threshold can be set at a value that is larger than approximately 10% of the internal ratios determined at stage 220, but smaller than approximately 90% of the internal ratios determined at stage 220. The lower threshold in this example would be set at the 10th percentile.

Similarly, stage 240 can include determining an upper threshold. The upper threshold could be set at the 90th percentile, for example. This threshold would be set at a value larger than approximately 90% of the internal ratios determined at stage 220, but smaller than approximately 10% of the internal ratios determined at stage 220. The percentiles in this example ($10^{th}$ and $90^{th}$) are provided merely as examples. Any percentiles can be used.

In some examples, a variable "C" is used to set the thresholds. The variable C can be established at the provisioning server 120, such as by an administrator with access to the provisioning server 120. The lower threshold percentile can be equivalent to C, while the upper threshold can be equivalent to 100 minus C. In the example above, C would be input as 10, causing the lower threshold to be the $10^{th}$ percentile and upper threshold to be the $90^{th}$ percentile. The provisioning server 120 can then determine the number of internal ratios calculated for the reference servers and determine a lower ratio and upper ratio that correspond to the lower percentile and upper percentile, respectively.

Stage 230 of the method can include identifying the servers in the user's 110 inventory. While stage 220 relates to all servers listed in the reference library, stage 230 is specific to the servers available to the user 110. This can include, for example, the servers in the cloud-based infrastructure 140. The provisioning server 120 can obtain or generate a list of servers in the cloud-based infrastructure 140. The list can be obtained from a storage location accessible by the provisioning server 120, for example. In another example, the provisioning server 120 can detect the servers in the cloud-based infrastructure 140 and generate a list based on that detection.

At stage 250, the method can include classifying the servers identified at stage 230. For example, stage 250 can include determining an internal ratio for each server identified at stage 230. The internal ratios can be determined in a similar manner as explained above. The internal ratios can then be compared to the lower and upper thresholds determined at stage 240.

For example, the thresholds calculated at stage 240 can be set at the $10^{th}$ and $90^{th}$ percentiles, as described above, and those percentiles can reflect internal ratios of 1.5 and 12.2, respectively. In other words, the lower threshold is a ratio of 1.5 and the upper threshold is a ratio of 12.2 in this example. Stage 250 can include comparing the ratio of each available server to these thresholds.

Because the internal ratios are ratios of memory to computing power, lower internal ratios would reflect memory-heavy servers while higher internal ratios would reflect compute-heavy servers. Therefore, for servers in the cloud-based infrastructure 140, ratios below the lower threshold can be considered memory optimized and ratios above the upper threshold can be considered compute optimized. These two categories can be broken down further based on the presence or absence of a GPU in the server. In that case, the four categories would include: (1) memory optimized servers (e.g., servers with an internal ratio below the lower threshold without a GPU provisioned), (2) compute optimized servers (e.g., servers with an internal ratio above the upper threshold without a GPU provisioned), (3) memory and graphics optimized servers (e.g., servers with an internal ratio below the lower threshold having a GPU provisioned), and (4) compute and graphics optimized servers (e.g., servers with an internal ratio above the upper threshold having a GPU provisioned).

The categories identified above can also be reflected in the request received at stage 210. For example, the request can include an identification of an expected category of workload. Example workload categories can include (1) memory-heavy workloads, (2) compute-heavy workloads, (3) memory- and graphics-heavy workloads, and (4) compute- and graphics-heavy workloads.

Not all servers in the cloud-based infrastructure 140 will necessarily fit within one of the four categories identified above. In some examples, an insufficient number of servers will fit into these categories. The method can include adjusting C values—and thereby adjusting the thresholds—automatically based on an insufficient number of servers fitting within these categories. For example, the C values can be adjusted to use the 20th and 80th percentiles, respectively.

Stage 260 can include clustering similar servers within at least one of the groups established at stage 250. Clustering can be performed according to known methods, such as K-means clustering. The clustering can be based on the internal ratios of the servers in the relevant group. In some examples, the clustering at stage 260 can pertain only to the group of servers relevant to the user's 110 request. For example, if the user's request identified a need for compute- and graphics-heavy workloads, then at stage 260 the clustering can be performed only for servers within the compute- and graphics-heavy server group. In other examples, the clustering can be performed for servers in each of the four groups.

Stage 270 can include sorting the clusters obtained at stage 260. This stage can include normalizing the numbers regarding CPUs, RAM, and GPUs. To normalize these numbers, a total number of each of CPUs, RAM, and GPUs are established for each cluster. This can include adding the numbers of CPUs, RAM, and GPUs for each server in the cluster. These numbers are then divided by two, repeatedly until the number for at least one of CPUs, RAM, or GPUs (if the cluster is a group that includes GPUs) is below one. Normalizing the numbers in this manner allows different clusters to be compared based on their relative strengths and weaknesses.

Stage 270 can then include sorting the clusters based on the normalized numbers obtained above. For example, if the user 110 is seeking a memory-optimized VM configuration, the clusters can be sorted based on their normalized CPU count. In some examples, each cluster can be considered a potential VM configuration that the user can utilize for their computing needs.

The sorted clusters, or VM configurations, can be presented to the user 110 via the interface 130 at stage 280. For example, the user 110 can be presented with a list of the top clusters for VM configuration. This process is described in more detail with respect to FIGS. 3 and 4.

At stage 290, the provisioning server 120 can collect feedback from the cloud-based infrastructure 140 and use the feedback to adjust the threshold values for future determinations at stage 240. The feedback can include determining the total memory and CPU counts for the memory-optimized and CPU-optimized servers that are deployed at the cloud-based infrastructure 140 on behalf of the user 110. This information can be used to calculate average memory-to-CPU ratios for the deployed servers in each respective group. These averages can then be used to set the percentiles for the upper and lower thresholds at stage 240. In other words, the servers deployed in each group can be used to establish new baselines, such that future recommendations include recommendations for servers and clusters that are at least as effective and efficient as the average server or cluster in each group.

Figure 3:
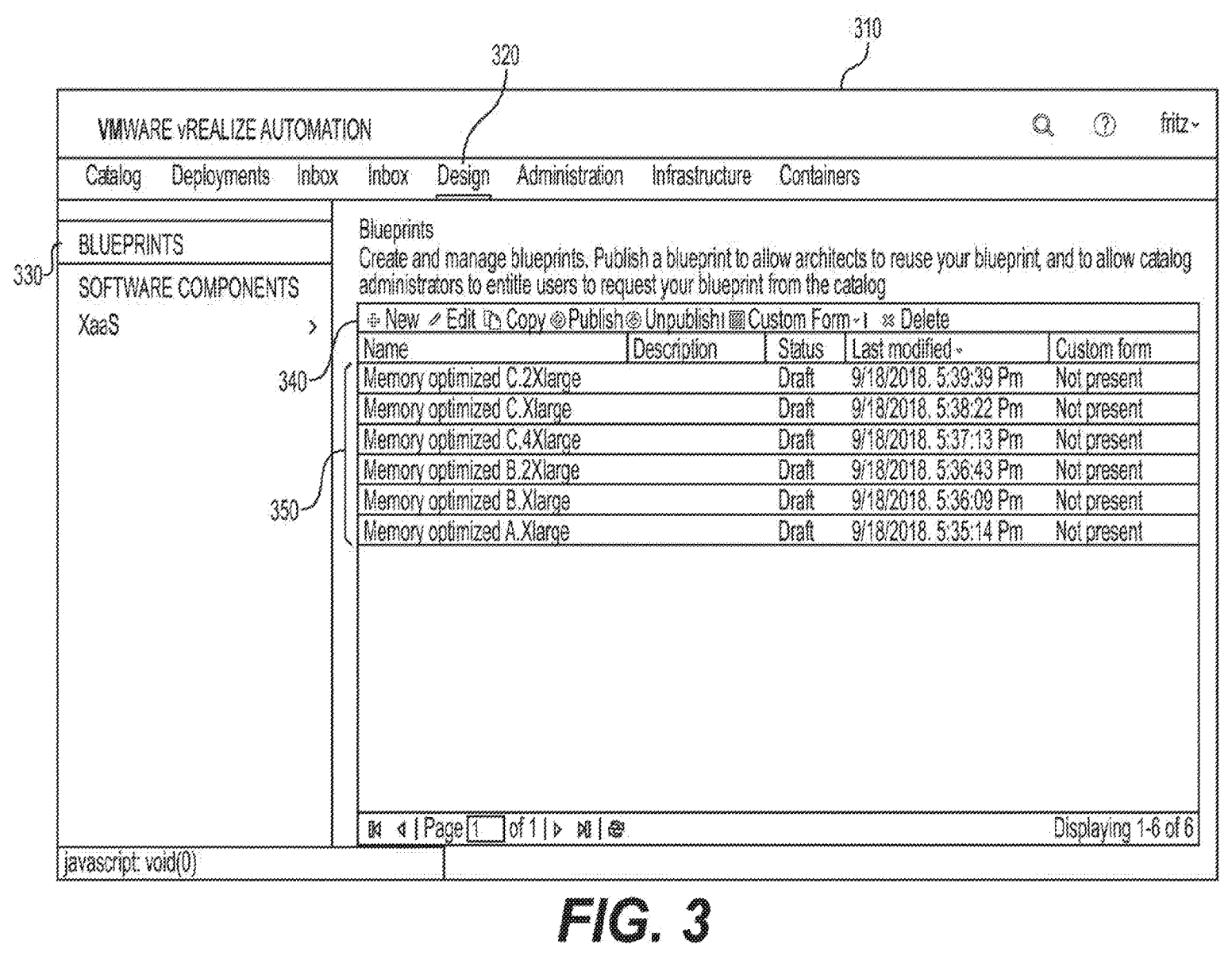

FIG. 3 provides an illustration of an example GUI 310 that can be accessed by the user 110. In some examples, the GUI 310 is part of the interface 130 described above with respect to FIG. 1. The GUI 310 can provide various options for designing and deploying the cloud-based infrastructure 140. For example, the user can select a Design tab 320 from a list of tabs across the top of the GUI 310. Selecting the Design tab 320 can cause several design-related options to appear on a menu in the left-hand column. In this example, the options include Blueprints 330, Software Components, and XaaS. Blueprints 330 can refer to recommendations for VM configurations as described above. Software Components can include software, including plugins, used to access, manage, deploy, or troubleshoot the cloud-based infrastructure 140. Finally, XaaS can include anything provided as a service, such as software, platforms, or infrastructure. The user 110 can adjust features and services through that tab.

In the example of FIG. 3, the user 110 has selected the Blueprints tab 330 from the left-hand menu. Selecting this tab can cause the provisioning server 120 to execute the stages of the example method of FIG. 2, in one example. In other examples, the GUI 310 can include a selection element, within the Blueprints tab 330, that the user can select to cause the provisioning server 120 to execute the method. For example, the GUI 310 can ask the user if he or she would like recommendations for VM configurations for the cloud-based infrastructure 140. In other examples, the provisioning server 120 can automatically provide the VM configurations based on a perceived need of the user 110—such as based on a detection that the user 110 is utilizing an inefficient VM configuration for their needs. Any of these triggers for providing the VM configurations can be considered part of the request described in stage 210 of FIG. 2.

In some examples, the Blueprints tab 330 includes a mechanism for the user 110 to provide information regarding the type of workload they anticipate for the cloud-based infrastructure. For example, the user 110 can be prompted to select a particular type of workload they expect. The prompt can include categories that relate to the four categories described above, such as (1) memory intensive, (2) compute intensive, (3) memory and graphics intensive, and (4) computer and graphics intensive. The user's 110 selection can guide the recommendation process as described with respect to FIG. 2.

The GUI 310 of FIG. 3 shows VM configuration recommendations for memory-optimized servers. In this example, the user 110 has indicated that they anticipate a memory intensive workload for cloud-based infrastructure 140. The provisioning server 120 has performed the stages of FIG. 2 and is displaying the results 350, which include six different VM configurations. The user 110 can select any of the results 350 and use a modifier 340 to edit, copy, publish or unpublish, or create a new configuration.

Figure 4:
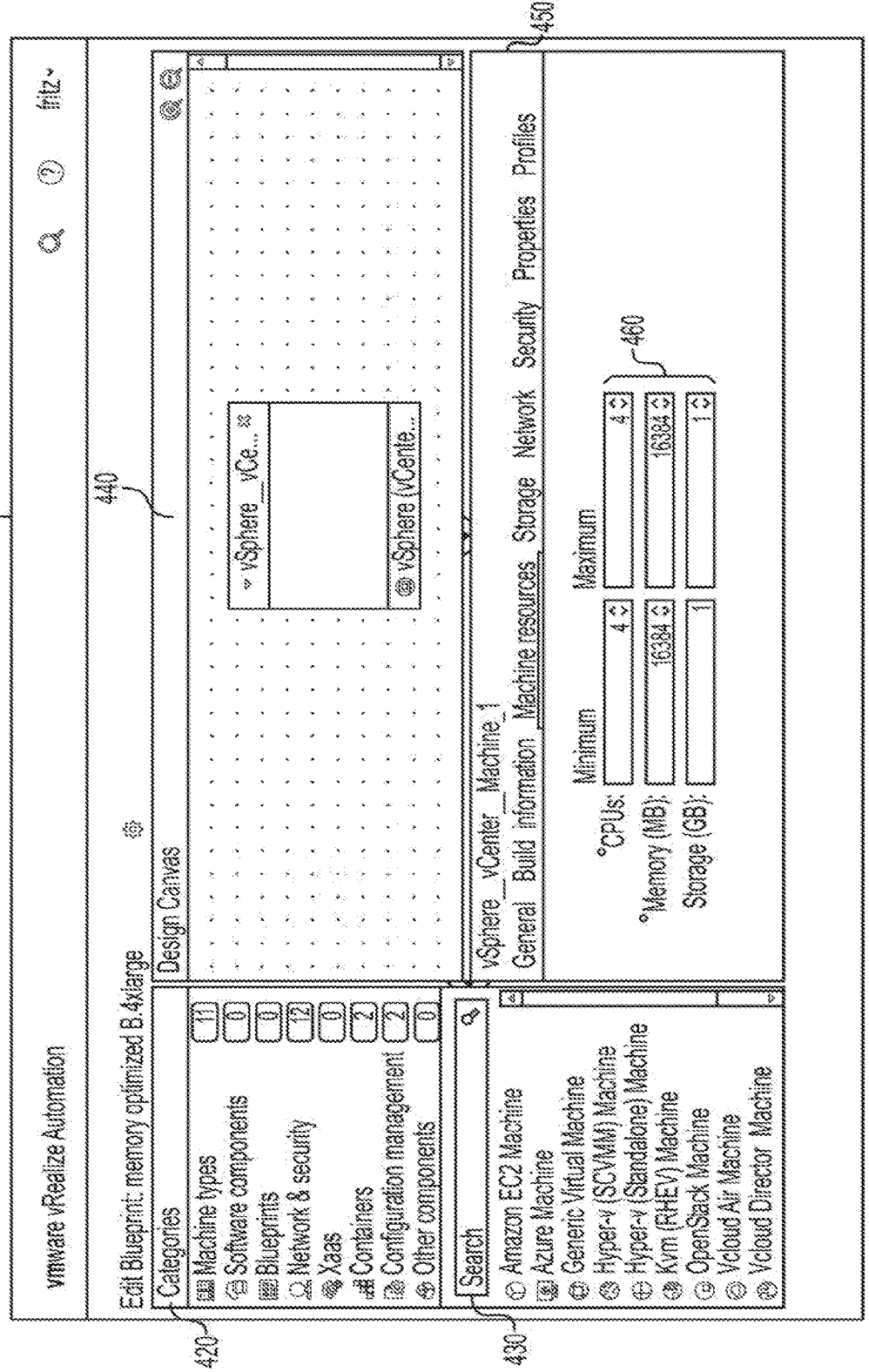
FIG. 4 is an illustration of a second example GUI for performing the various methods described herein.

FIG. 4 shows a GUI 410 displayed at the interface 130 after a user 110 selects one of the results 350 from FIG. 3 and chooses to edit it. In this example, the user has selected the result 350 corresponding to "memory optimized B.4xlarge." GUI 410 includes a Categories box 420 that displays counts for various categories of information pertaining to the selected result 350. In this example, the Categories box 420 includes counts for machine types, software components, blueprints, network & security components, XaaS, containers, configuration management, and other components. This Categories box 420 provides the user 110 with information at a glance and can also provide the listings in the form of links that launch other GUI pages with options to further customize each category.

The GUI 410 can also include a Search bar 430 that allows the user 110 to search for particular machine types. The user 110 can select one or more specific machine types to use for the selected VM configuration. In some examples, if the user 110 does not select specific machine types, the provisioning server 120 will automatically recommend suitable machine types based on the user's 110 needs.

The GUI 410 can also include a design canvas 440 that allows a user 110 to visually configure the suggested VM configuration. The user 110 can select a machine type and drag-and-drop it on the design canvas 440, for example. The user 110 can also add components, such as specific VMs, firewalls, or any type of hardware or software abstractions. The user 110 can arrange the components to modify their functionality. For example, arranging a two separate VMs with a firewall between them would indicate that a firewall should exist at the communication link between those two VMs.

The GUI can also include a customization box 450 that allows the user 110 to alter the recommended VM configuration as desired. For example, the customization box 450 can include parameters 460 that can be modified by the user 110. In this example, the parameters 460 include the number of CPUs, the amount of memory, and the amount of storage. The user 110 can set minimum and maximum numbers for each of these parameters 460. This can be useful in situations where, for example, the recommended VM configuration is properly optimized but is too powerful, or too weak, for the user's 110 needs. For example, the user 110 may require only 2 CPUs, in which case the user 110 can select the element associated with the minimum CPU parameter. In some examples, the provisioning server 120 can suggest a different VM configuration based on parameter 460 inputs received at GUI 410. Once the user 110 is satisfied with the VM configuration, they can save and deploy it at the cloud-based infrastructure 140 via the provisioning server 120.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for recommending virtual machine (VM) configurations, comprising:
    receiving a selection of a category of computing resources;
    receiving a request to recommend a VM configuration, the request including an indication of the selected category, wherein receiving the request to recommend the VM configuration comprises displaying a graphical user interface (GUI) and receiving, through the GUI, user input regarding a minimum number of computer processing unit (CPU) cores, a minimum amount of memory, and a minimum amount of storage;
    identifying a pool of available servers that meet the minimum number of CPU cores, the minimum amount of memory, and the minimum amount of storage;
    classifying the servers in the pool of servers into a plurality of categories;
    clustering similar servers within each of the plurality of categories;
    for each cluster, sorting the servers according to the indicated most relevant computing resources; and
    displaying on the GUI the VM recommendations based on the sorting of the servers.

2. The method of claim 1, further comprising determining that the user is utilizing a suboptimal VM configuration.

3. The method of claim 1, wherein classifying the servers into the plurality of categories comprises:
    obtaining, from a reference library, information regarding a plurality of server types; and
    comparing the plurality of server types to the servers in the pool available to the user.

4. The method of claim 1, wherein classifying the servers into the plurality of categories further comprises determining a computing ratio for each of the plurality of servers, the computing ratio being a ratio of memory to CPU cores for each server.

5. The method of claim 4, wherein classifying the servers into the plurality of categories further comprises comparing the computing ratio for each of the plurality of servers to a threshold computing ratio.

6. The method of claim 1, further comprising receiving a user selection from the displayed VM recommendations and configuring a VM based on the user selection.

7. The method of claim 1, further comprising receiving a user selection from the displayed VM recommendations and changing a license type of at least one server based on the user selection.

8. A non-transitory, computer-readable medium containing instructions that, when executed by a hardware-based processor, cause the processor to perform stages for recommending virtual machine (VM) configurations, the stages comprising:
    receiving a selection of a category of computing resources;
    receiving a request to recommend a VM configuration, the request including an indication of the selected category, wherein receiving the request to recommend the VM configuration comprises displaying a graphical user interface (GUI) and receiving, through the GUI, user input regarding a minimum number of computer processing unit (CPU) cores, a minimum amount of memory, and a minimum amount of storage;
    identifying a pool of available servers that meet the minimum number of CPU cores, the minimum amount of memory, and the minimum amount of storage;
    classifying the servers in the pool of servers into a plurality of categories;
    clustering similar servers within each of the plurality of categories;
    for each cluster, sorting the servers according to the indicated most relevant computing resources; and
    displaying on the GUI the VM recommendations based on the sorting of the servers.

9. The non-transitory, computer-readable medium of claim 8, the stages further comprising determining that the user is utilizing a suboptimal VM configuration.

10. The non-transitory, computer-readable medium of claim 8, wherein classifying the servers into the plurality of categories comprises:
    obtaining, from a reference library, information regarding a plurality of server types; and
    comparing the plurality of server types to the servers in the pool available to the user.

11. The non-transitory, computer-readable medium of claim 8, wherein classifying the servers into the plurality of categories further comprises determining a computing ratio for each of the plurality of servers, the computing ratio being a ratio of memory to CPU cores for each server.

12. The non-transitory, computer-readable medium of claim 11, wherein classifying the servers into the plurality of categories further comprises comparing the computing ratio for each of the plurality of servers to a threshold computing ratio.

13. The non-transitory, computer-readable medium of claim 8, the stages further comprising receiving a user selection from the displayed VM recommendations and configuring a VM based on the user selection.

14. The non-transitory, computer-readable medium of claim 8, the stages further comprising receiving a user selection from the displayed VM recommendations and changing a license type of at least one server based on the user selection.

15. A system for recommending virtual machine (VM) configurations, the system comprising:
    a memory storage including a non-transitory, computer-readable medium comprising instructions; and
    a computing device including a hardware-based processor that executes the instructions to carry out stages comprising:

receiving a selection of a category of computing resources;

receiving a request to recommend a VM configuration, the request including an indication of the selected category, wherein receiving the request to recommend the VM configuration comprises displaying a graphical user interface (GUI) and receiving, through the GUI, user input regarding a minimum number of computer processing unit (CPU) cores, a minimum amount of memory, and a minimum amount of storage;

identifying a pool of available servers that meet the minimum number of CPU cores, the minimum amount of memory, and the minimum amount of storage;

classifying the servers in the pool of servers into a plurality of categories;

clustering similar servers within each of the plurality of categories;

for each cluster, sorting the servers according to the indicated most relevant computing resources; and displaying on the GUI the VM recommendations based on the sorting of the servers.

16. The system of claim 15, the stages further comprising determining that the user is utilizing a suboptimal VM configuration.

17. The system of claim 15, wherein classifying the servers into the plurality of categories comprises:
   obtaining, from a reference library, information regarding a plurality of server types; and
   comparing the plurality of server types to the servers in the pool available to the user.

18. The system of claim 15, wherein classifying the servers into the plurality of categories further comprises determining a computing ratio for each of the plurality of servers, the computing ratio being a ratio of memory to CPU cores for each server.

19. The system of claim 18, wherein classifying the servers into the plurality of categories further comprises comparing the computing ratio for each of the plurality of servers to a threshold computing ratio.

20. The system of claim 15, the stages further comprising receiving a user selection from the displayed VM recommendations and configuring a VM based on the user selection.

* * * * *